United States Patent [19]

Yamashita et al.

[11] Patent Number: 4,583,909
[45] Date of Patent: Apr. 22, 1986

[54] INDUSTRIAL ROBOT

[75] Inventors: Kazuichi Yamashita, Kyoto; Toshio Saito, Koube; Keiichi Zin; Yoshiro Takemoto, both of Hirakata, all of Japan

[73] Assignee: Matsushita Electric Industrial Co., Ltd., Kadoma, Japan

[21] Appl. No.: 574,096
[22] PCT Filed: May 12, 1983
[86] PCT No.: PCT/JP83/00141
    § 371 Date: Jan. 11, 1984
    § 102(e) Date: Jan. 11, 1984
[87] PCT Pub. No.: WO83/03995
    PCT Pub. Date: Nov. 24, 1983

[30] Foreign Application Priority Data

May 12, 1982 [JP] Japan ................... 57-80452

[51] Int. Cl.4 .................. B66F 11/00; B25J 11/00
[52] U.S. Cl. ........................ 414/749; 901/16; 901/27; 403/400
[58] Field of Search .................. 901/16, 27; 414/749–751; 403/389, 400

[56] References Cited

U.S. PATENT DOCUMENTS

1,806,534  5/1931  Hamilton .................. 403/400
4,132,318  1/1979  Wang et al. ............... 901/16 X
4,274,801  6/1981  Herb et al. ............... 414/749 X Primary Examiner—William E. Wayner
Attorney, Agent, or Firm—Wenderoth, Lind & Ponack

[57] ABSTRACT

An industrial robot having a plurality of units each consisting of a unit body provided with a movable block having a mounting surface, a side placed parallel to this movable block, exposing only small parts of its mounting surface, a mounting bottom extending perpendicular to this side and a guide which supports the aforementioned movable block in such a way that it is movable parallel to the mounting surface and in a straight line in a definite range, a driving device on the unit body to drive the movable block, and a control device for controlling this driving device, the plurality of units being coupled in such a way that the straight line moving directions of the movable blocks of each two coupled units are at a right angle. The units are connected through a mounting structure having a first mounting surface on the mounting surface of the movable block of one of the aforementioned units and a second mounting surface which makes a right angle to this first mounting surface and on which the mounting surface of the unit body of the other unit is placed, whereby various movements can be obtained by coupling of respective units through the mounting structure.

3 Claims, 16 Drawing Figures

INDUSTRIAL ROBOT

FIELD OF ART

The present invention relates to an industrial robot movable in a space defined by the orthogonal coordinates system and provides a device having a simple structure which ensures high positional accuracy as well as high interchangeability and which also permits easy alteration of its operation range.

BACKGROUND ART

Heretofore, orthogonal coordinates system robots have existed in large numbers and many proposals have been made.

However, since these devices have been built as devices for exclusive use for definite purposes, they lack flexibility for making them adaptable for other uses or for altering their operation ranges or operating positions, and large scale or complex operations such as moving the robot body itself or changing the operating position by altering the control program are required.

DISCLOSURE OF INVENTION

The industrial robot of this invention has a plurality of units each consisting of a unit body provided with a moving block having a mounting surface, a side placed parallel to the mounting surface, exposing parts of the mounting surface, a mounting bottom at a right angle to this side and a guide 10 which supports the aforementioned movable block, permitting its straight line movement over a definite range in a direction parallel to the mounting surface, a driving means affixed to this unit body for driving the aforementioned movable block and a control means. For controlling this driving means the aforementioned plurality of units are coupled through a mounting means having a first mounting surface mounted on the mounting surface of the movable unit of one of the units abovementioned and a second mounting surface which makes a right angle to this first mounting surface and on which is placed the mounting plane of the unit body of another unit in such a way that the directions of the straight line movement of the movable blocks of each two units make a right angle with each other; and a robot capable of varying movable ranges may be easily constructed by coupling a plurality of such units, the coupling between each two units being easy, with only a minimum surface of the movable block exposed for fitting the mounting means.

THE MOST PREFERRED EMBODIMENT OF THE INVENTION

In the following an embodiment of this invention is described with reference to FIGS. 1~8.

Figure 1:
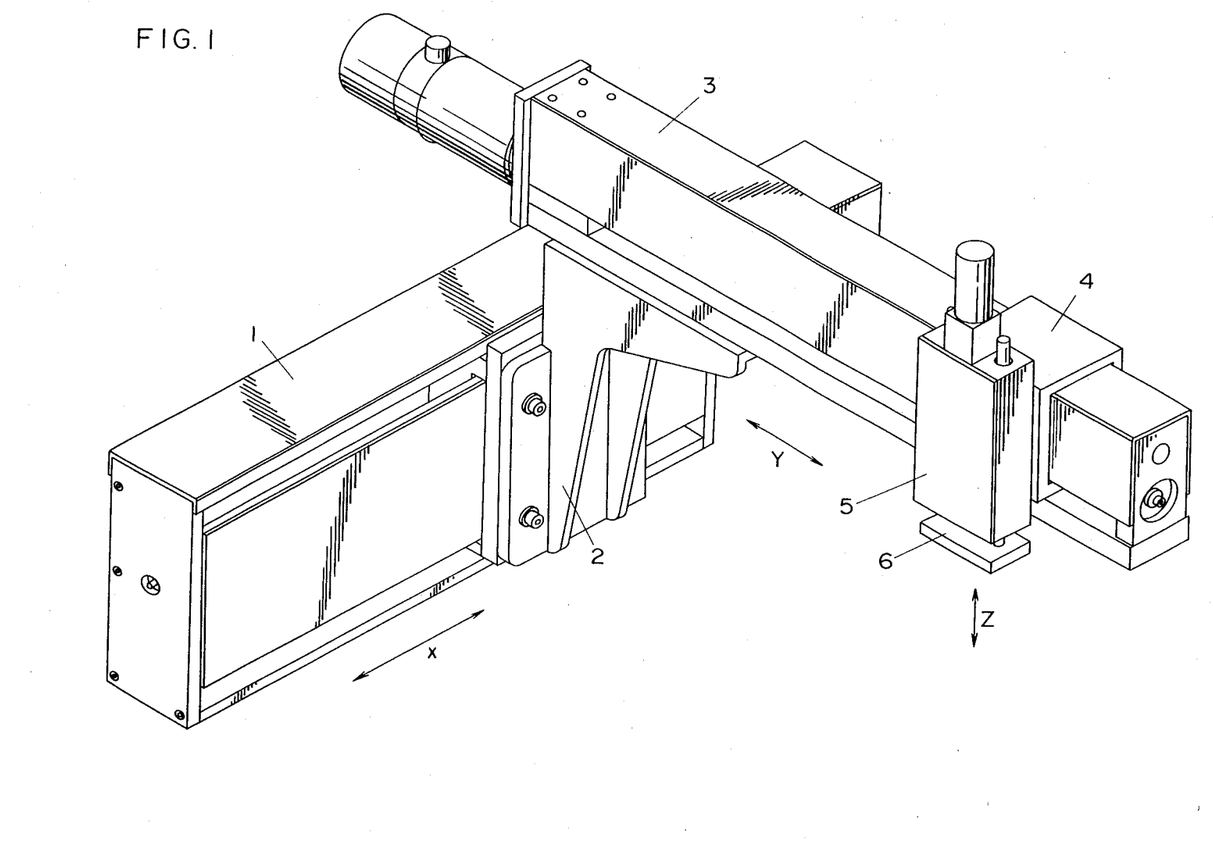
FIG. 1 is a perspective view of an industrial robot embodying this invention.

The numeral 1 denotes an X-axis unit, on which a first mounting means 2 is slidable in the x-direction as indicated by the arrow. The numeral 3 represent a Y-axis unit, which is affixed on the aforementioned first mounting means 2 and on which a second mounting means 4 is slidable in the y-direction perpendicular to the x-direction as indicated by the arrow. The numeral 5 designates a Z-axis unit, which is mounted on the second mounting means 4 and on which a plate 6 is slidable in the z-direction, as indicated by the arrow, perpendicular both to the x-direction and the y-direction.

Figure 2:
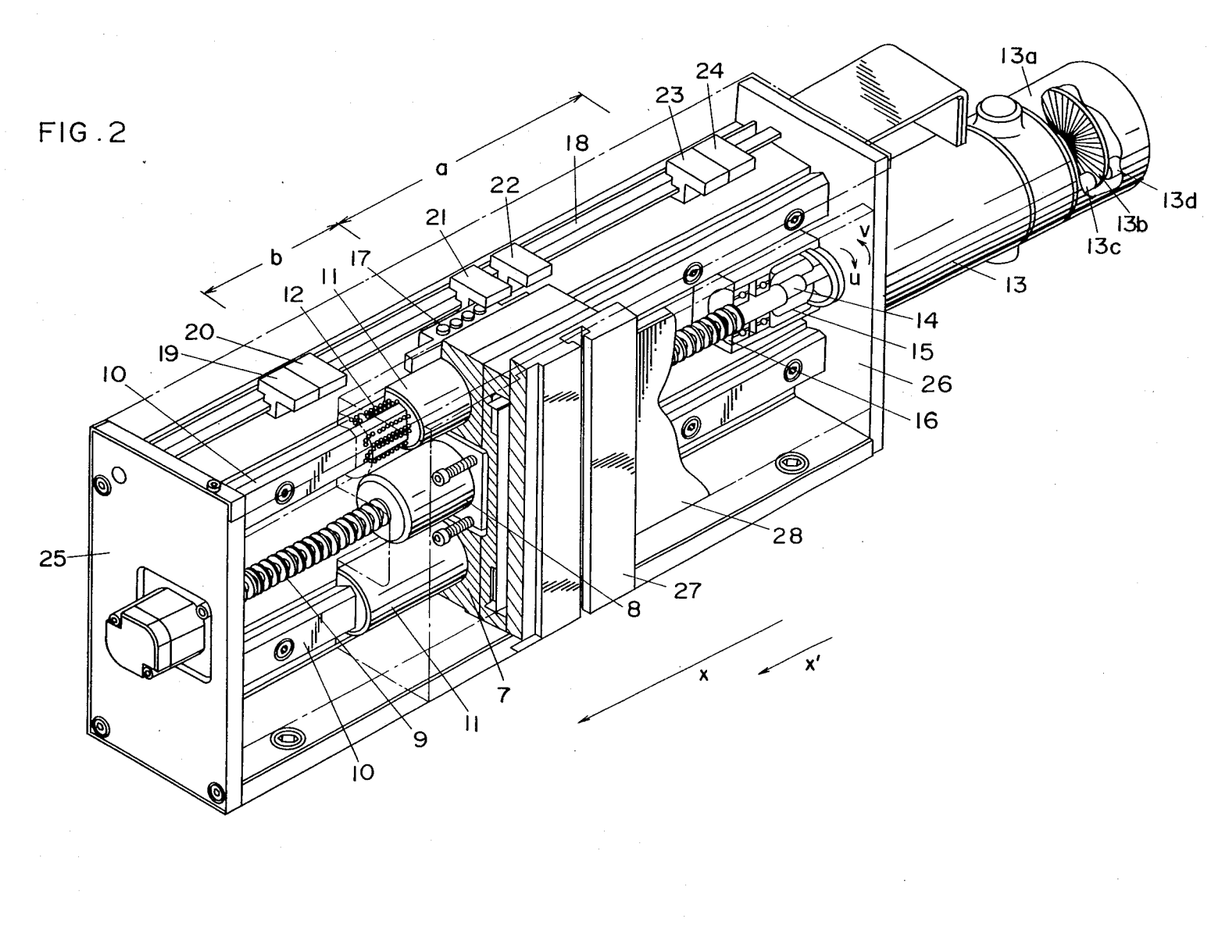
FIG. 2 is a partly broken away perspective view of an X-axis unit thereof.

In the following, respectively, the X-axis unit, Y-axis unit and Z-axis unit are described in detail:

The numeral 7 designates a movable block, on about the center of which a ball nut 8 is securely held, this ball nut 8 and a ball screw 9 being engageable. The numeral 10 indicates guides placed parallel to the axial direction of the ball screw 9 and at a specified distance on both sides of the ball screw 9. The numeral 11 designates movable block supports being fixed on the movable block and mounted on guides 10 through balls 12, so as to be slidable in their axial direction. The numeral 13 designates a motor, which rotatably drives to the tip 14 of the ball screw 9 through a joint 15.

Figure 3:
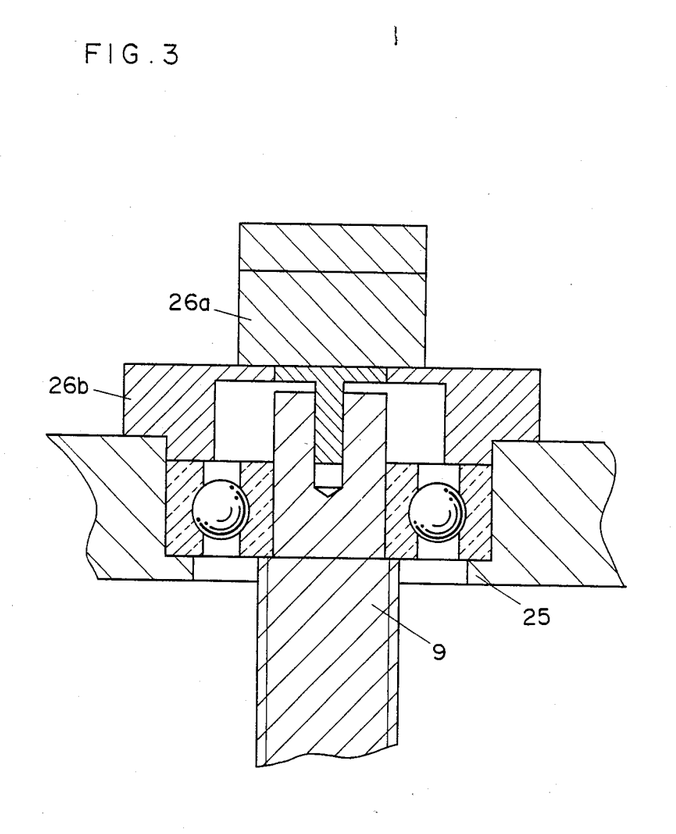
FIG. 3 is a sectional view of a tacho-generator of the X-axis unit thereof.

The numeral 13a designates a rotary encoder, which is fixed on the rear of the motor 13. The rotary encoder 13a has a rotatable disc 13b, light projector 13c and light receiver 13d facing two surfaces of this disc 13b and an amplifier circuit for signals (not shown in the drawing). The disc 13b has slits radially extending from its center toward its periphery, is fixed on an extension of the output shaft of the motor 13, to be rotated integrally therewith. The light projector 13c and the light receiver 13d are not in contact with the aforementioned disc 13b, but the disc 13b is securely held in such a position that it cuts the optical axis therebetween. The numeral 16 designates ball bearings, located at both ends of the ball screw 9, which rotatably support the ball screw 9. The numeral 17 denotes a magnet, which is fixedly held on the movable block 7. The numeral 18 designates a bracket for holding sensors, which is placed in parallel with the axial direction of the ball screw 9 and on which sensors 19, 20, 21, 22, 23 and 24 composed of hole elements are fixed at appropriate intervals where they can detect the magnet 17. The sensors 19, 20, 21, 22, 23 and 24 are fixed by means of bolts on the bracket 18. The numerals 25 and 26 designate end plates which are fixed to the bracket 18, ball bearings 16 and guides 10. The numeral 26a designates a tacho-generator, which is located at an end of the ball screw 9 and rotatably mounted on tacho-generator mounting plate 26b. The numeral 27 indicates a flat front mounting plate, fixed at the top and bottom of the movable block 7, with a space provided at the center. In this space, a cover 28 is inserted and its ends are respectively securely set on side plates 25 and 26. Around this X-axis unit 1, a housing, shown in phantom lines, is mounted, to prevent entrance of dust, etc.

Figure 4:
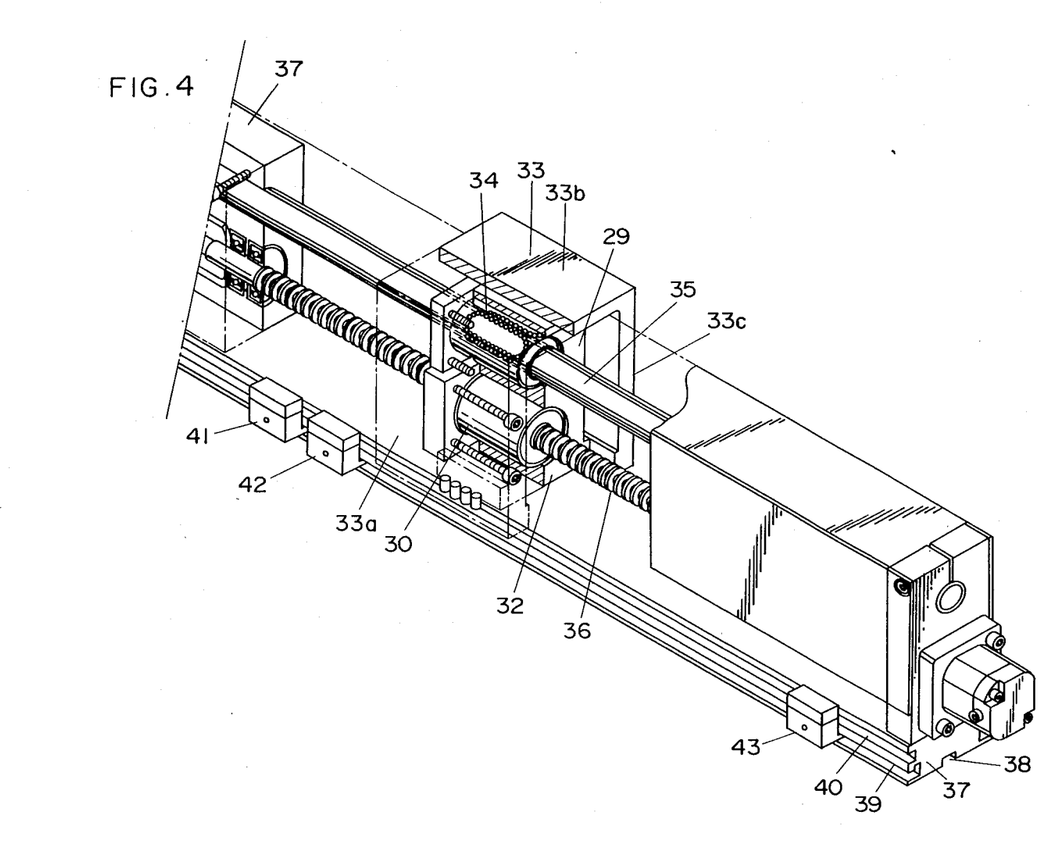
FIG. 4 is a partly broken away perspective view of a Y-axis unit thereof.

Next, the Y-axis unit 3 is described. The Y-axis unit 3 is constructed similarly to the X-axis unit. The movable block 29 has a ball nut 30 and movable block support 31 and a projection at its bottom is fixed to a plate 33 having three mounting surfaces 33a, 33b and 33c. The numeral 35 designates a guide, which is mounted on the movable block support 31 through balls 34 and held parallel to ball screw 36 which is engageable with the aforementioned ball nut 30. The numeral 37 designates a bottom plate which has a key way 38 in its length direction and grooves 39 and 40 on its side; in these grooves, sensors 41, 42 and 43 which detect the magnetic force of the magnet fixed on the plate 33 are held in place.

Figure 5:
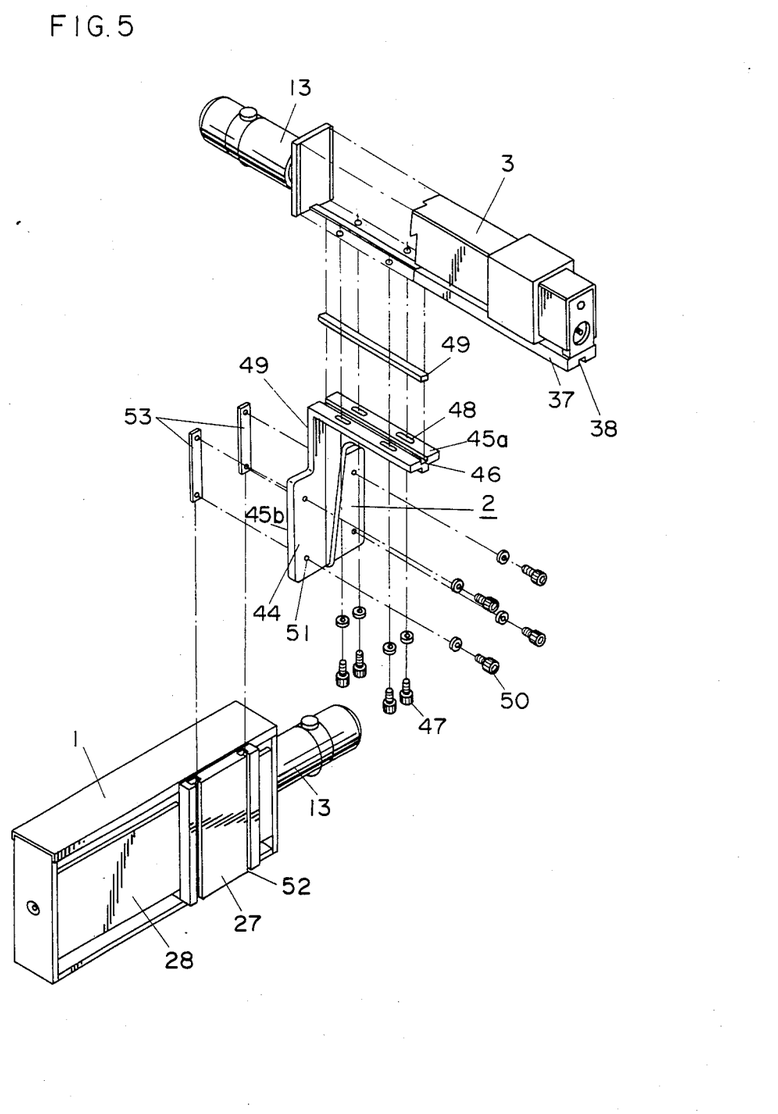
FIG. 5 is an exploded view of the X-axis unit and the Y-axis unit.
Figure 6:
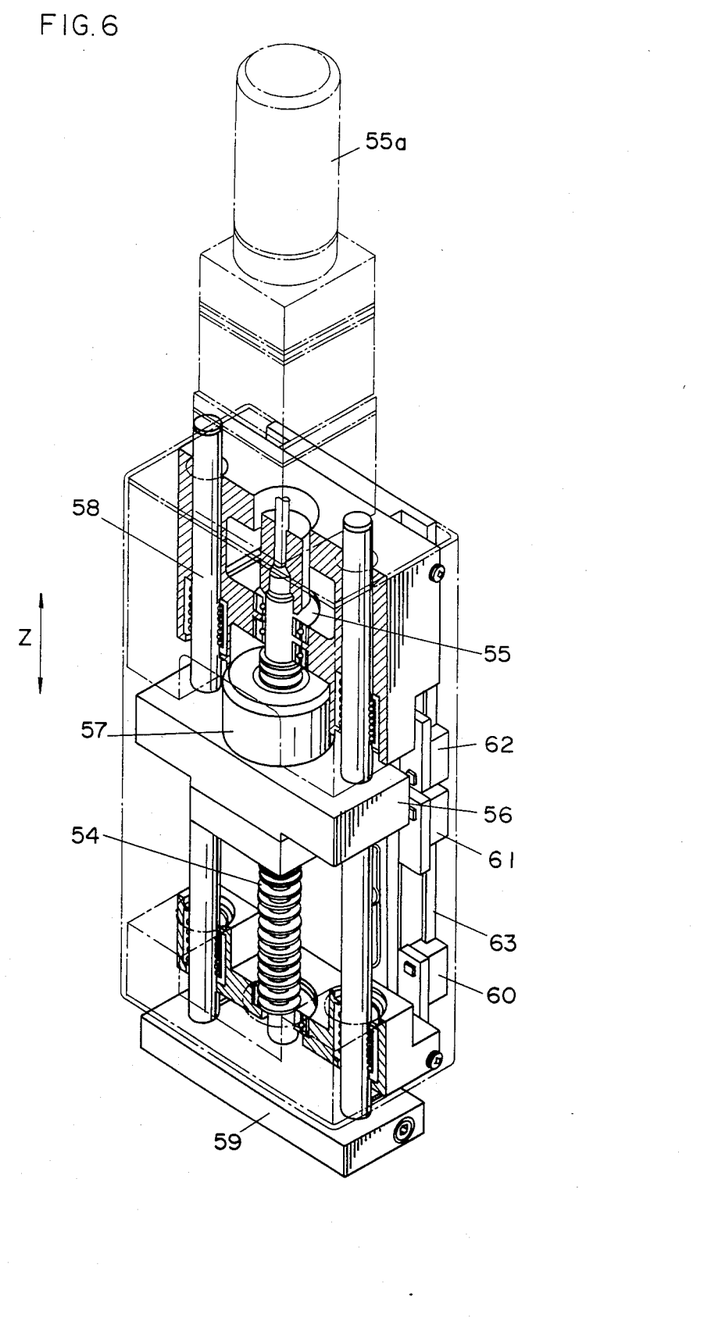
FIG. 6 is a partly broken away perspective view of a Z-axis unit.

In the first mounting means 2, the numeral 44 denotes an L-shaped bracket, which has a key way 46 in the length direction of a first mounting surface 45a and a plurality of oblong slots 48 which permit insertion of bolts 47. The numeral 45b designates a second mounting surface. The numeral 49 indicates a key, its upper part being engageable with the key way 38 of the Y-axis unit 3 and its lower part engageable with the aforementioned key way 46. The flat surface part 45b of the L-shape bracket 44 has holes 51 which permit insertion of bolts 50. The L-shape bracket 44 is securely held on the front plate 27 by means of bolts 50 and rectangular nuts 53 which are insertable in T-shaped grooves 52 in the front plate 27 of the X-axis unit 1. In, the Z-axis unit 5, the numeral 54 designates a ball screw, which is rotatably supported at both ends by ball bearings 55 and which is rotatably driven by a motor 55a. The numeral 56 designates a movable block, which has a ball nut 57, which is engageable with the aforementioned ball screw 54, fixed thereon, and a guides 58 extend parallel to the axial direction of the ball screw 54. The numeral 59 gives a mounting plate, which is fixed to the tip of the aforementioned ball screw 54 and to the guides 58 and is slidable in the z-direction. The numerals 60, 61 and 62 designate sensors, which are fixedly mounted on bracket 63 to detect the magnetic force of the magnet embedded in a movable block. Around this Z-axis unit, a housing, shown in phantom lines, is provided for prevention for entrance of dust, etc.

Figure 7:
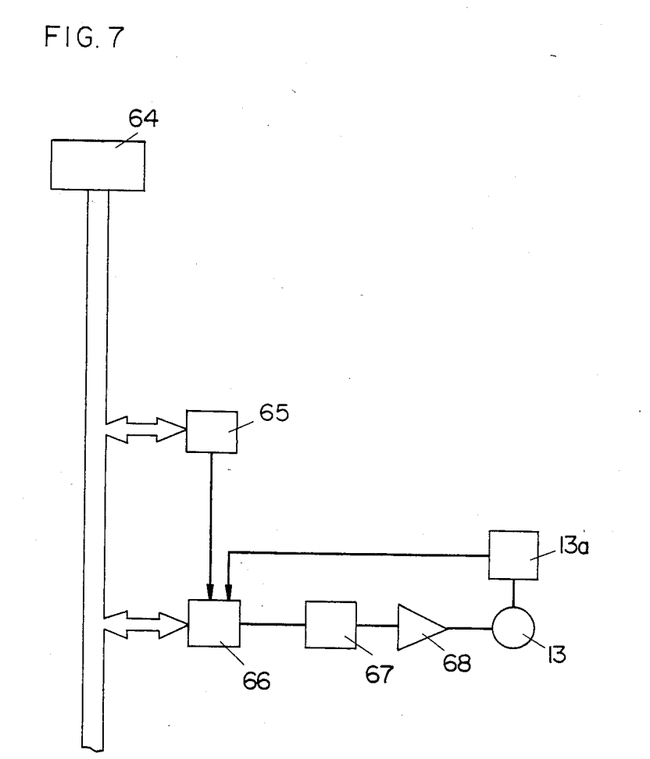
FIG. 7 is a flow chart for showing the positioning method.

The operation of the industrial robot with the aforedescribed structure is described in the following. In order to position the plate 6 in a two dimensionally defined position, input is supplied by means of a keyboard, etc., with selections made of the coordinates at the destination, point-to-point, straight-line interpolation and arc interpolation. With the moving pulse numbers for the straight-line interpolation, arc interpolation, point-to-point and the moving data preliminarily stored in a microcomputer 64, interpolation pulses are generated by this microcomputer 64 through a function generating large scale integrated circuit (hereinafter abbreviated LSI) 65. First, the process of the plate 6 moving in the x-direction is described. In the aforementioned function generating LSI 65, an internal operation is performed in a definite cycle, to deliver the interpolation pulses to the position controlling LSI 66 for the X-axis unit. The output signal generated by the position controlling LSI 66 which has received the interpolation pulses is converted into an analog signal through digital-analog converter 67, is further amplified by a servo-amplifier so that the motor 13 of the X-axis unit 1 can be operated thereby and the motor is caused to run. By the turning of this motor 13, the plate 6 mounted on the Y-axis unit 3 moves in the x-direction; the position controlling LSI 66 will operate until the difference between the feedback pulses generated by the encoder installed on the ball screw 9 and the total number of the set interpolation pulses becomes zero and the output signal will be produced. The rotational driving power of the motor 13 is transmitted to the ball screw 9 through the joint 15 and the tip 14 of the ball screw, causing the ball screw 9 to rotate. At this time, the ball nut 8 fixed to the movable block 7 is engaged with the ball screw 9, but since the movable block 7 is not rotatable about the axial center of the ball screw 9 due to the guide 10, it merely slides in the x-direction.

Figure 8:
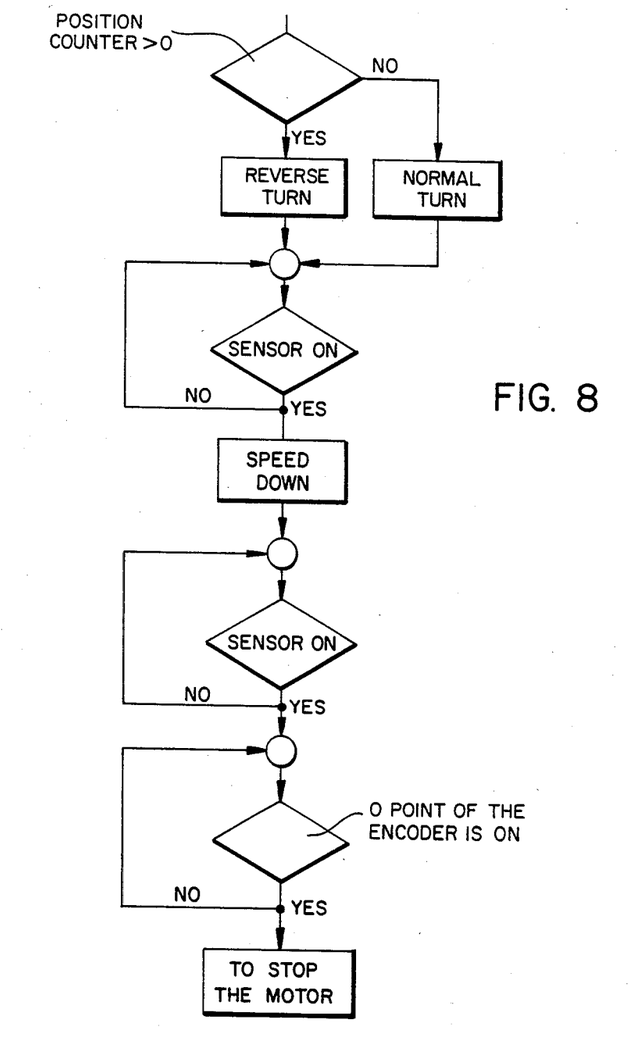
FIG. 8 is a flow chart for explanation of zero reset making.
Figure 9:
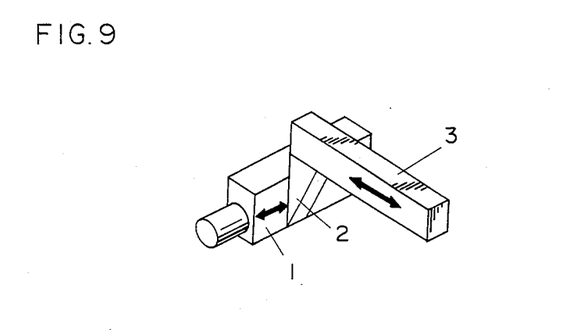
FIGS. 9~16 are perspective views of industrial robots formed by assembling the X-axis unit, Y-axis unit and the Z-axis unit.
Figure 10:
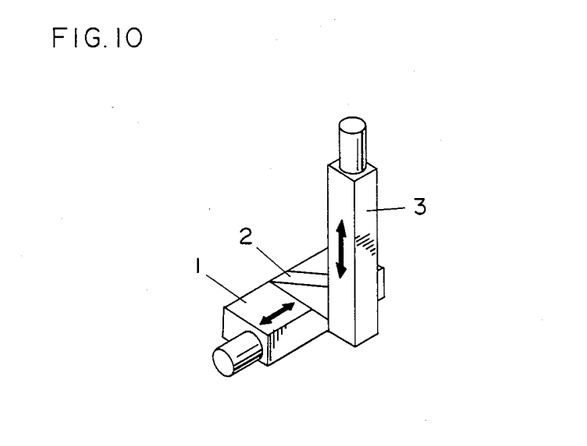
Figure 11:
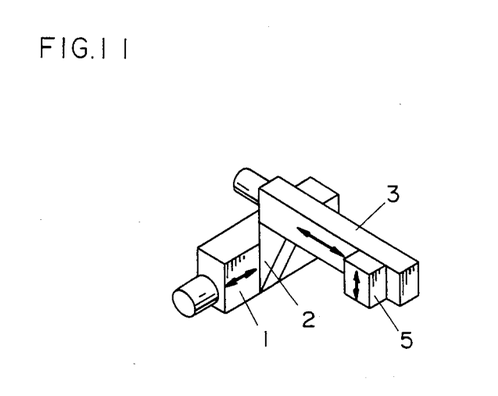
Figure 12:
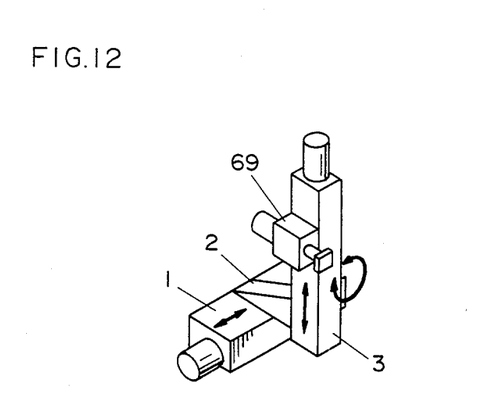
Figure 13:
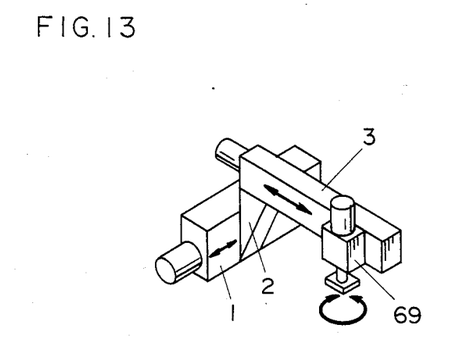
Figure 14:
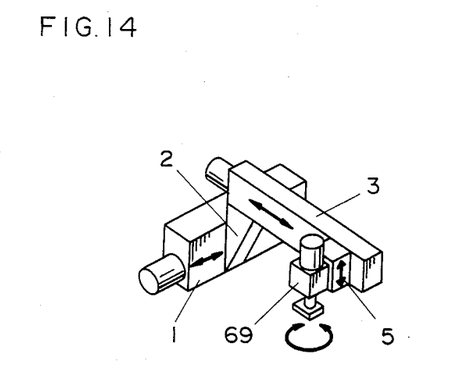
Figure 15:
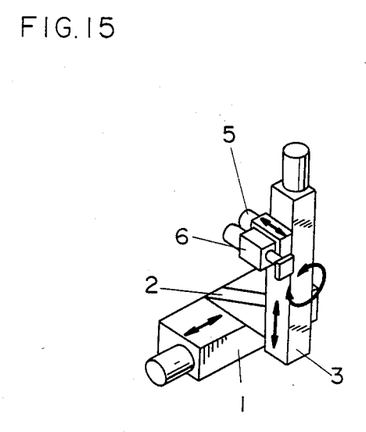
Figure 16:
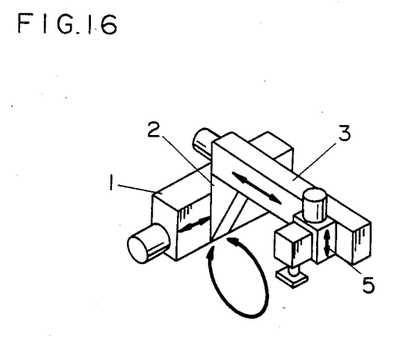

In the following, the zero point resetting of the first mounting means 2 and the plate 27 is described with reference to FIG. 8: First, as the zero reset signal is produced, whether the position of the first mounting means 2 and the plate 27 is plus or minus from the zero point is judged by reference to the stored data; then, if it is in the plus region a, a signal is sent so that the motor 13 makes its normal rotation in the u-direction, or if in the minus region b, its opposite rotation in the v-direction. Now, assuming that the movable block 7 is located in the plus region a, because the afore-mentioned motor turns in the u-direction, the movable block 7 moves in the x'-direction and the magnet 17 on the movable block 7 is detected by the sensor 22. With the slow speed value preliminarily stored in an integrated circuit memory (hereinafter abbreviated IC memory), the output signal for the digital-analog converter from the position controlling LSI 66 is controlled by this signal, causing the runnng of the motor 13 to slow down. Then similarly as the magnet 13 of the movable block 7 is detected by the sensor 21, for further correct position detection, whether it is at the zero point or not is judged by the encoder 13a and if it is at the zero point, a signal for stopping the motor 13 is sent. A similar operation is carried out when the movable block 7 is in the minus region. Thus first, the sensor 21, upon detecting the movable block, causes it to go slow, then, the sensor 22 detects it and, further, the encoder 13a detects the zero point, causing the motor 13 to stop. Because the magnet 17 has a length in the x-direction, the movable block 7, whether it is located in the plus region or in the minus region, zero point resetting is possible.

If, although the position of the movable block 7 is stored in the IC memory for the plus region, its real position is in the opposite region, as, for example, when it is manually disposed in the minus region thereafter, etc., then an attempt to carry out zero reset will lead to a movement of the moving block 7 in the opposite direction from the zero point, but it will be detected by the sensor 20 or the sensor 23. At this time point, the motor voltage is instantaneously reversed, resulting in reverse turn of the motor. On the other hand, outside the zero point reset time, as the sensor 19 or the sensor 24 detects the movable block 7 in a runaway movement etc., for example, the microcomputer 64 will reset the position controlling LSI 66, causing the motor voltage to be 0V, thereby stopping the motor 13 or forcibly stopping the motor which has been brought into a short-circuited state by a relay circuit.

With regard to the Y-axis unit, similar positioning, zero-point reset and overrun prevention will be similarly conducted as in the case of the X-axis unit.

FIGS. 9~16 show that various operations are possible by combinations of the X-axis unit, Y-axis unit and the Z-axis unit. The numeral 69 designates a rotary unit for permitting rotation of the plate attached to the tip around the axis of screw 54. The control is selectable through combination of various units.

POTENTIAL MERITS IN INDUSTRIAL UTILIZATION

According to the invention for which application has now been filed, it is possible to simultaneously control positions of respective units—the X-axis unit, the Y-axis unit, etc.—and provide simple unit-by-unit mounting, freedom in assembling and interchangeability as well as carrying out easy setting and change of the moving range through selection of the mounting position of each unit on the mounting means and the shape of the mounting means. Besides, the X-axis or Y-axis unit, etc., permits coupling between transfer units, with only minimum parts of the movable block exposed for fitting the mounting means, so that an industrial robot having excellent accuracy and safety as well as resistance to the environment can be provided.

What is claimed is:

1. An industrial robot comprising:
   at least two units each having an elongated housing, at least one guide mounted in said housing extending along the length thereof, a movable block mounted for movement along said guide, a driving means connected to said movable block for driving said block reciprocally along said guide means, a side wall of said casing having at least one slot therealong parallel to said guide means, and a mounting plate having means extending through said slot for mounting on said movable block and having a lateral mounting surface parallel to the direction of movement of said mounting block; and
   a mounting means having two mounting surfaces thereon which are orthogonal to each other, one connected to the lateral mounting surface of said mounting plate of one of said units, and the casing of the other unit having a wall other than the said side wall mounted on the other orthogonal surface of said mounting means with the guide in said other unit extending orthogonally to the guide in said one unit.

2. An industrial robot as claimed in claim 1 in which one of the mounting surfaces of the mounting plate of the one unit and the mounting means connected thereto has means thereon for movably mounting said mounting means on said mounting plate for movement orthogonal to the guide in said one unit and to the guide in the other unit.

3. An industrial robot as claimed in claim 1 in which one of the other mounting surface of said mounting means and the side wall of the other unit has means thereon for movably mounting said other unit on said mounting means for movement parallel to the guide in said other unit.

* * * * *